Figure 1:
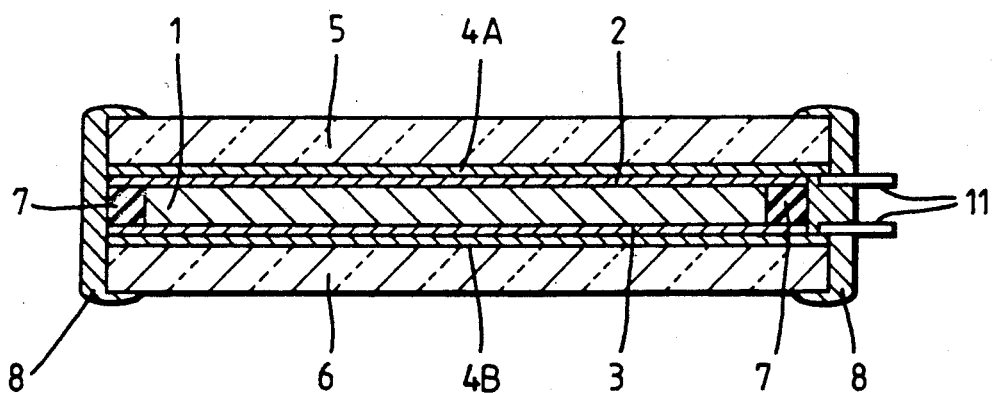

United States Patent [19]

Cheshire

[11] Patent Number: 5,206,756
[45] Date of Patent: * Apr. 27, 1993

[54] SOLID STATE ELECTROCHROMIC DEVICES

[75] Inventor: Philip Cheshire, Lancashire, England

[73] Assignee: Imperial Chemical Industries PLC, London, England

[*] Notice: The portion of the term of this patent subsequent to Mar. 19, 2008 has been disclaimed.

[21] Appl. No.: 630,996

[22] Filed: Dec. 19, 1990

[30] Foreign Application Priority Data

Dec. 20, 1989 [GB] United Kingdom ............... 8928748

[51] Int. Cl.$^5$ .............................................. G02F 1/23
[52] U.S. Cl. ................................. 359/270; 359/265; 252/62.2
[58] Field of Search ............... 350/357; 252/62.2, 600; 429/192, 194; 359/265, 270; 204/14.1

[56] References Cited

U.S. PATENT DOCUMENTS

| | | | |
|---|---|---|---|
| 4,505,538 | 3/1985 | Toussaint et al. | 350/357 |
| 4,654,279 | 3/1987 | Bauer et al. | 252/62.2 |
| 4,715,691 | 12/1987 | Sata et al. | 350/357 |
| 4,792,504 | 12/1988 | Schwab et al. | 252/62.2 |
| 4,798,773 | 1/1989 | Yasukawa et al. | 429/192 |
| 4,970,012 | 11/1990 | Kuroda et al. | 252/62.2 |
| 5,001,023 | 3/1991 | Cheshire et al. | 429/94 |
| 5,016,991 | 5/1991 | Mason | 252/62.2 |
| 5,028,124 | 7/1991 | Akhtar | 350/357 |

FOREIGN PATENT DOCUMENTS 1-020257 1/1989 Japan ................... 252/62.2

Primary Examiner—Rolf Hille
Assistant Examiner—Tan Ho
Attorney, Agent, or Firm—Cushman, Darby & Cushman

[57] ABSTRACT

An electrochromic device which comprises two conductive electrodes separated by a solid electrolyte and an electrochromic material capable of reversible electrochromic interaction with activating electrons and/or ions furnished to it by, or by it to, the rest of the device under the influence of an electrical potential applied across the electrodes, characterized in that the solid electrolyte in the device comprises:

a) a matrix of optionally cross-linked main polymer chains, having side-chains linked to the main polymer chains, which side chains comprise polar groups,
b) an ionized ammonium or alkali metal salt dissolved in the matrix and/or liquid, and
c) an optional polar aprotic liquid dispersed in the matrix, and a process for the preparation thereof.

9 Claims, 1 Drawing Sheet

SOLID STATE ELECTROCHROMIC DEVICES

This invention relates to devices which comprise a particular solid electrolyte

Electrochromic devices comprising a solid electrolyte are known for use as display devices. They may also be used to make variable transmission optical devices such as variable optical density windows (in the broadest sense of the word 'window').

In such known devices an electrochromic material interacts with guest ions or electrons fed to it by the application of an electrical potential to the device, in a manner which affects its interaction with incident electromagnetic radiation (e.m r.), e.g. a visible change. (Since the electrochromic material is generally in contact with one of the electrodes by which potential is applied to the device, and hence bears some electrical charge, it is unclear whether any guest activating species within the electrochromic material is strictly ionic or atomic. When used herein in relation to such species the term 'ions' therefore includes any species which may be generated by the passage of activating ions into the electrochromic material including atoms.) The solid electrolyte in the device serves to transmit the activating ions and/or electrons under the applied potential.

In such electrochromic devices, the components are conveniently in the form of relatively thin layers, which are laminated together to form a 'multilaminar' device, in which at least the electrochromic material and the solid electrolyte, is sandwiched between two electrodes. The layers are preferably essentially colourless and normally transparent or translucent in one state of the device.

Such a state is normally that before a potential is applied across the electrodes to bring about an electrochromic change in the electrochronic material).

Such electrochromic devices usually require a solid electrolyte which is a a fast ionic conductor for ionic activating species.

Generally, such an electrolyte is necessarily a rigid and dense conductive glass or bulky plastics electrolyte for satisfactory robustness and operation.

Examples of suitable materials which are generally used are sodium beta-alumina or solid electrolytes of the type known as Bordeaux Glass Alternatively, polymeric semi-fluid electrolytes containing an alkali metal anion are used, often of the type known as Grenoble polymeric electrolytes, as described e.g. in Br. Poly. J 1975, 7, 319–327. Such semi-fluid plastics electrolytes require rigid containment and support for satisfactory robustness and operation.

All such electrolytes suffer from a number of (other) disadvantages. Thus, e.g. in several applications where solid-electrolyte electrochromic devices are potentially useful, such as automotive windows, there is is a need for a multilaminar electrochromic device which is conformable to any desired shape, whilst being structurally robust, e.g. it may be readily formed to describe not only any one-dimensional curvilinear (e.g. cylindrical) surface, but also any two-dimensional curvilinear (e.g. spheroidal or ellipsoidal) surface without rupture of the electrolyte or loss of electrical properties The physical stability of a multilaminar electrochromic device comprising a solid state electrolyte is directly related to the degree of tack of the electrolyte to the adjacent device components.

In known electrochromic devices, the electrolyte a) is either inconveniently rigid or fluid, and/or
b) has insufficient elasticity, tensile strength, tear resistance and/or tack to provide a satisfactory conformable yet robust device.

We have now found that a particular solid electrolyte may readily be formed in situ and optionally cross-linked in an electrochromic device or precast and optionally cross-linked into a discrete easy to handle thin film having good tensile properties The material also has excellent suitability for use in existing lamination technology, e.g. for safety glass, whether it is cast or precast and optionally cross-linked or not. The precast and optionally cross-linked solid electrolyte has the additional advantage in further lamination of controlling or minimising any unwanted solvents content.

Further, the particular solid electrolyte has good adhesion to any other component of the device with which it is in contact, thus promoting not only good device stability, but also good electrical contact within the device.

Additionally, the tack may be readily varied and controlled by adjusting readily variable parameters of the electrolyte.

The use of a solid electrolyte with the combination of these physical properties inter alia enables the production of electrochromic devices in an embodiment in which the electrodes, electrochromic material and in particular the solid electrolyte are thin films.

The resultant electrochromic device itself may thus be light, of low density and highly compact.

The electrolyte in such a device is conformable to any desired shape, whilst being structurally robust, thereby providing a solution to the problem noted above.

Moreover, such a device may be constructed in a form which gives a fairly rapid response to relatively small applied potentials of the order of 1 to 3 volts.

This type of solid electrolyte is further described hereinafter and is known herein as 'The Solid Electrolyte'.

In a first aspect the present invention thus provides an electrochromic device which comprises two conductive electrodes separated by the Solid Electrolyte and an electrochromic material capable of reversible electrochromic interaction with electrons and/or ions furnished to it by, or by it to, the rest of the device under the influence of an electrical potential applied across the electrodes.

It will be seen that the present device is in effect an electrochemical cell.

The various components of the cell may conveniently be made in the form of thin layers.

These layers are deposited on a transparent, translucent or reflective substrate.

The thin layer-form of the present device is often arranged in the following order of layers with consecutive layers in mutual electrical contact: first electrode, electrochromic material, Solid Electrolyte, optional sink/source for the activating species for the electrochromic material, and second electrode.

The present invention also provides a method of producing such an electrochromic device.

The Solid Electrolyte in the present device comprises:

a) a matrix of optionally cross-linked main polymer chains, optionally having side-chains linked to the main polymer chains, which side chains comprise polar groups, b) an ionised ammonium or alkali metal salt dissolved in the matrix and/or liquid, and c) an optional polar aprotic liquid dispersed in the matrix.

The present polymer matrix tends to be a mainly amorphous single phase These properties give rise to good room temperature conductivity and mechanical properties.

One embodiment of the Solid Electrolyte comprises the polar aprotic liquid c). When used herein ' aprotic ' means not only free from protons but also free from active hydrogen atoms In another embodiment of the Solid Electrolyte the main polymer chains in the matrix (to which the side chains are linked) are predominantly cross-linked, directly and/or via the side chains.

Where the device comprises a reactive metal, e.g. lithium, as described further hereinafter, the polar groups in the side chains in the matrix a) are preferably free from active hydrogen atoms or ions.

The main polymer chains in the matrix may be for example:

essentially organic main polymer chains, optionally comprising sulphur, nitrogen, phosphorus or (preferably) oxygen atoms; or inorganic-organic main polymer chains, such as ones comprising silicon and oxygen atoms, for example comprising polymeric polysiloxane chains Where the main polymer chains are essentially organic polymer chains, these may favourably be polyethers, polyacrylics or polyvinylics, in particular polyethers, which may be optionally interrupted, e.g. by urethane groups.

The main or side chains optionally contain cross-linked, cross-linking or cross-linkable groups, such as cross-linked, or cross-linkable —C=C— groups, and cross-linking urethane functions.

Often, however, such main or side-chains contain no, or at most a few, free cross-linkable functions, e.g. —C=C— functions or —OH groups which are convertible to urethane cross-links.

Comment is made hereinafter regarding the spatial distribution of any cross-linking within the polymer matrix, in particular as between the surface and the bulk of the Solid Electrolyte (in effect that it is preferred that the surface is essentially uncrosslinked and liquid-like for good tack).

Subject to these, an average degree of cross-linking of up to 10 wt % of the total electrolyte, in particular up to 5 wt %, is preferred.

Each main chain is favourably linked to an average of at least 2, and preferably at least 4, for example 10 to 10,000, side-chains as hereinbefore defined.

The polar groups in such side-chains may for example be ester or ether linkages

Such side-chains may in particular be, e.g. polyalkylene oxide side-chains linked to the main chains by oxy groups.

In such favoured main polymer chains and sidechains, the equivalent ratio of side-chain polar groups to total carbon atoms in the matrix may suitably be 1:1.5 to 1:4, preferably 1:2 to 1:3.

The significance of the number of polar side-chains per matrix polymer molecule in optimising the surface tack of the Solid Electrolyte has been indicated hereinbefore.

It is also described in greater detail hereinafter in a summary of physical parameters of the matrix which have this effect.

A polar side-chain content of 2 to 40 mol % of the matrix polymer, in particular 15 to 35 mol % is preferred.

Where the side chains are relatively long and/or have a relatively high polar group content, it may be advantageous to the electrical and/or mechanical properties of the corresponding Solid Electrolyte for the sidechains to be branched.

Main chains with side-chains of the above favoured polyether types may be made for example by polymerising monomers such as an alkyl poly(alkylene oxide) glycidyl ether, e.g. methyl digol glycidyl ether.

Favoured polyether main chains with such side chains may be made by comprising alkylene or alkapolyene oxide comonomers, such as ethylene and/or propylene oxide or butadiene monoxide in the polymerisation.

Such polyether main chains may be interrupted by urethane groups by comprising polyfunctional isocyanates in the polymerisation.

Cross-linkable polymers of these types may be made by copolymerising glycidyl methacrylate or glycidyl acrylate monomers.

They may also be made by using vinyl glycidyl ether or allyl glycidyl ether in placed of these last-named components.

This polymerisation may be effected using a catalyst which is appropriate to any reactive groups present in the monomer, and which will be apparent to the skilled man e.g. a basic anionic catalyst (e.g. disodium dialkoxide) or a complexed Lewis acid catalyst (e.g. Vandenberg's or Teyssie's catalyst)

Any free terminal —OH groups of the polyether side chains may if desired be capped with alkyl groups, preferably methyl, as noted below.

Polyacrylic main chains with side-chains of the above favoured polyether types may be made for example by polymerising monomers which are cooligomers of ethylene and/or propylene oxide, end-capped with an acrylic monomer, such as with an acryloyl group.

This polymerisation may suitably be carried out under conventional, e.g. thermally induced free radical, conditions.

Polyvinylic main chains with side-chains of the above favoured polyether types may be made for example by polymerising monomers which are cooligomers of ethylene and/or propylene oxide, end-capped with an vinylic group, such as with a vinyl group, under e.g. thermally induced free radical conditions.

Where the device does not contain a reactive metal, e.g. lithium, polymers with some side-chains ending in OH or COOH groups may advantageously have good adhesion to e.g. an adjacent metal oxide electrochromic material of the device.

These polymers may be produced e.g. by copolymerisation of/end-capping with a small amount of methacrylic acid or hydroxyethyl methacrylate in the present polymers during formation and/or optional cross-linking.

In general, where where the device comprises a reactive metal, e.g. lithium, as described further hereinafter, the side chains are favourably end-capped polyether chains (optionally concomitantly cross-linked, as described further below).

By 'end-capped' herein is meant that terminal OH groups in such chains are replaced by groups without active hydrogen atoms, e.g. ether or ester groups.

Thus, in the specific polyether main chain polymers, free OH groups may be reacted to eliminate the active hydrogen atoms ('capped'), (for example by forming alkoxy groups) by reacting them with an alkyl halide e.g. methyl chloride in the presence of a basic catalyst. They may also be capped by forming ester groups with a carboxylic acid or anhydride.

Where main or side chains of the foregoing type contain —OH groups, e.g. from alkylene oxide (co)monomer, free OH groups may be reacted not only to eliminate the active hydrogen atoms (i.e. capped), but also to cross-link the main chains within the main polymer chains or via the side chains (depending on the location of the —OH groups) for example by reacting them with a polyfunctional isocyanate to form urethane linkages Where main chains of the foregoing type contain —C=C— groups, e.g. from butadiene monoxide comonomer, the chains may be optionally cross-linked within the main polymer chains using for example free radical initiators or Γ-radiation, generally after side chain formation and capping (if effected).

The significance of the spatial distribution of any cross-linking within the polymer matrix, in particular as between the surface and the bulk of the Solid Electrolyte, in optimising the the surface tack of the Solid Electrolyte has been indicated hereinbefore.

It is also described in further detail hereinafter in a summary of physical parameters of the matrix which have this effect.

We have found that it is preferred that the bulk of Solid Electrolyte is cross-linked, inter alia for the beneficial effect on the tensile strength and tear resistance of the Solid Electrolyte.

It is however preferred that the surface is essentially uncrosslinked and liquid-like for good tack.

This may be achieved e.g.

a) by ensuring the presence essentially at the surface only of a small amount of oxygen during cross-linking (except in the case of polymer main chains comprising polysiloxane chains, optionally cross-linked by groups R as hereinafter defined, e.g. in the case inter alia of polyether, polyacrylic, polyvinylic and polyurethane main chains); or b) by the Solid Electrolyte being a composite material comprising a cross-linked bulk matrix with an uncrosslinked matrix material one or both surfaces, which may contain a polar aprotic liquid dispersed in it and/or an ionised salt dissolved in it the liquid.

In case b), each of the matrix polymer and any salt or liquid present in it may be the same as that in the bulk of the Solid Electrolyte or different; any salt and/or liquid is often the same.

The surface layer of uncrosslinked material suitably is 5 to 200 micron thick, e.g. 10 to 50 micron and/or forms 5 to 20 wt% of the total matrix material.

The main polymer chains may also be organic-inorganic, optionally cross-linked polymer chains comprising polysiloxane chains.

Such chains (together with the side-chains linked thereto) are preferably of the formula:

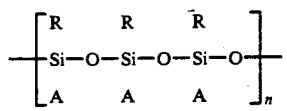

wherein
each group R independently is alkyl or optionally cross-linked alkenyl, and
each group A is a group as defined for R or a sidechain (as hereinbefore defined) comprising an end-capped polyether, e.g. a capped polyalkylene oxide group, at least 20% and preferably at least 40% of the groups A being such side chains.

Each R and each A when alkyl or alkenyl is preferably independently $C_{1-6}$ alkyl or optionally cross-linked $C_{1-6}$ alkenyl, in particular methyl.

A when an end-capped polyether, may be e.g. a capped polyalkylene oxide group, at least 20% and preferably at least 40% of the groups A being such side chains.

Such polysiloxane chains may be optionally cross-linked within the main polymer chains through the groups R and/or A (as hereinbefore defined) through —C=C— functions in those groups.

Such groups often contain no, or at most few, free —C=C— functions.

In the case of main polymer chains of this type the matrix may suitably be made by preforming individual chains, and optionally effecting subsequent cross-linking by heating.

It is preferred that any such optional cross-linking should be carried out in an inert atmosphere, for example of nitrogen Oxygen may be present if desired but tends in this case to accelerate cross-linking and thus produces a "skin" on any surface of the material which is in contact with it.

Cross-linking may be achieved even if no unsaturated groups are present by, for example, heating with free radical forming substances for example peroxides, such as benzoyl peroxide.

However, this procedure may cause adhesion of the matrix to a vessel in which it is made and it is preferred that any optional cross-linking should take place by reaction of C=C bonds.

From the foregoing it will be seen in summary that the matrix may be formed inter alia by a) adding the side chains (as defined) to a matrix of corresponding main polymer chains without side chains, or b) polymerising monomer species consisting of the eventual side chains, end-capped with monomer units for the main chain, and then optionally cross-linking the resultant matrix of main polymer chains with side chains (as defined) linked to the main polymer chains.

In the case of such optional cross-linking, the initial matrix favourably is one which does not readily crystallise at −40° to 100° C., e.g. −20° to 100° C.

Matrix formation by any of the foregoing methods will generally be effected during production of the Solid Electrolyte as described further hereinafter.

When present, the polar aprotic liquid optionally dispersed in the matrix may be for example ethylene or propylene carbonate;
a dialkyl-formamide or -sulphoxide preferably where each alkyl group is $C_{1-4}$ alkyl;

a cyclic ether, for example tetrahydrofuran;

a higher viscosity liquid such as sulpholane; or higher molecular weight congeners of the foregoing, for example bis(polyalkoxyalkyl) carbonates such as bis(methoxyethoxyethyl) carbonate The liquid may typically be present in the matrix as 5 to 250 parts by weight, often 10 to 100 parts by weight, per 100 parts by weight of the matrix.

The significance of the the polar aprotic liquid content in optimising the the surface tack of the Solid Electrolyte has been indicated hereinbefore.

It is also described in further detail hereinafter in a summary of physical parameters of the matrix which have this effect. The robustness on the one hand, and the conductivity and tack on the other of the Solid Electrolyte, tend to depend in opposite senses on the polar liquid content.

A liquid content of 2 to 50 wt % of the total electrolyte, in particular 5 to 20 wt %, is preferred for these reasons.

Clearly the matrix should preferably be in practical terms insoluble in any polar aprotic liquid. If the matrix is soluble in the liquid, the concentration of liquid in the matrix should be insufficient to dissolve the matrix to any appreciable extent.

Of course where the or each salt is insoluble in the matrix the liquid concentration should be sufficient to dissolve the salt adequately Suitable materials, and concentrations within these constraints will be self-evident or a matter of routine trial.

The ions in the ionised ammonium or alkali metal salt dissolved in the matrix and/or liquid may be totally discrete and separated or may exist as ion pairs or higher aggregates (e.g. triple ions)

The salt may suitably be a salt of $NH_4$, Na, K or Li, favourably Na, K or Li, and preferably Li.

Suitable examples of the salt anion include $I^-$, $SCN^-$, $PF_6^-$, $AsF_6^-$, $BCl_4^-$, $BPh_4^-$ ions Suitable examples of the salt anion also include alkaryl sulphonate ions, $ClO_4^-$ and $BF_4^-$.

Preferred examples include $CF_3SO_3^-$.

A preferred salt is lithium triflate (lithium trifluoromethanesulphonate), $CF_3SO_3Li$.

Mixtures of salts may be used.

Thus, in the case of lithium triflate with an equivalent weight of 152, the salt is typically present as about 1 part by weight of salt per 0.5 to 120 parts by weight of polymer matrix, favourably 1.5 to 50 and preferably 3 to 20 parts by weight.

Where the matrix contains oxygen atoms in the side chains and/or the main polymer chains, these ratios may be expressed in terms of equivalents of matrix oxygen atoms.

The salt may be present as 1 equivalent per 4 to 100 equivalents matrix oxygen atoms, favourably per 10 to 40 equivalents.

The Solid Electrolyte may be made as a discrete component to be incorporated subsequently into the device of the present invention, or it may be made in situ on one or more of the other components of the device or within the device.

In each case it may be made by, in any feasible order:
a) forming the matrix
b) incorporating the highly ionised salt in the matrix or a precursor thereof, and
c) optionally introducing the aprotic liquid into the matrix or a precursor thereof.

The steps a) and b) and optionally c) are preferably carried out in the order b) and optionally c). using a matrix precursor, and then a).

In the first step b) and optionally c), the salt and optionally the polar aprotic liquid are dissolved in the matrix precursor, which may be a monomer or a non-crosslinked polymer precursor, or a solution of the foregoing or of the matrix polymer.

The precursor is often a solution of an uncross-linked matrix polymer, which may be the matrix polymer of the eventual Solid Electrolyte or may be a precursor for a cross-linked polymer of the eventual Solid Electrolyte.

After solution of the salt and optionally the liquid in the precursor solution, the solvent is evaporated in next step a) to form the Solid Electrolyte or an uncrosslinked precursor thereof.

Some loss of aprotic liquid if present will occur during the evaporation.

However, a slight excess over the final desired content of aprotic liquid may be used to compensate for this, and the the solvent may be routinely chosen by the skilled man to tend to minimise this loss Where an uncrosslinked matrix precursor is used for conversion to a cross-linked matrix, the cast Solid Electrolyte so obtained is subsequently cross-linked, often into its final form, and often in situ in the device of the present invention.

Means are often provided to effect such cross-linking of the intermediate matrix after its formation as described hereinbefore.

Thus, e.g. a cross-linking agent/initiator is preferably incorporated in the fluid precursor formed in first step b).

Heat or irradiation (e.g. i.r., u.v., high intensity visible, gamma, or electron beam) or plasma is then applied to the intermediate cast product.

The fluid precursor as appropriate with a cross-linking agent and/or a solvent is preferably cast and optionally cross-linked into its final form.

Less often, the steps of solvent loss and cross-linking may be carried out simultaneously by dissolving the matrix or a precursor thereof, the salt and any aprotic liquid in a suitable inert solvent, and allowing the solvent to evaporate. Again, loss of aprotic liquid if present will occur during the evaporation, but may be countered as above.

Also less often, as mentioned above, the precursor comprise a monomer or a solution thereof. Second step a) may be carried out in a number of variants as appropriate.

These include solvent removal, polymerisation and/or cross-linking in any feasible order or simultaneously.

In another less usual option. steps c) is effected after steps b) and a) in that order, ie in the final step c) the aprotic liquid is introduced by exposing the product Solid Electrolyte to the vapour of the liquid If necessary, such exposure may be carried out under reduced pressure and/or elevated temperature.

The fluid precursor or its solution may be cast and as appropriate evaporated, polymerised and optionally cross-linked into a sheet or thin film ex situ, and the product sheet or film of Solid Electrolyte or an uncrosslinked precursor thereof processed and used in a device of the present invention An uncrosslinked precursor may be cross-linked in situ in the device.

Alternatively, the fluid precursor or its solution may be cast, and as appropriate evaporated, polymerised and optionally cross-linked into the eventual Solid Electrolyte in situ onto another component of the device which will be adjacent to the Solid Electrolyte in the device e.g. as a sheet or thin film.

This has the advantages of tending to optimise the surface tack of the Solid Electrolyte and its adhesion to the adjacent component.

As a further alternative, a fluid precusor, preferably without solvent may be inserted into the device (e.g. by injection) and as appropriate polymerised and optionally cross-linked in situ into the eventual Solid Electrolyte in the device, again e.g. as a sheet or thin film.

This also has the advantages of:
tending to optimise the surface tack of the Solid Electrolyte and its adhesion to the adjacent component;
not requiring (although not excluding) any laminating process;
where the precursor is injected, not requiring a dry or clean room, or handling the film; and
where the precursor does not comprise solvent, not requiring solvent removal.

In an electrochromic device, the Solid Electrolyte (when typically in the form of a layer) may be of any thickness provided it is cohesive and continuous.

In thin multilaminar devices it is clearly advantageous and preferred that it be as thin as possible, providing that the device does not rely on conduction in the plane of the electrolyte layer.

The Solid Electrolyte may be be used as a source of activating metal ions for the electrochromic material (as described in greater detail hereinafter).

The size of the Solid Electrolyte may vary between wide limits, and it may be small, e.g. a thin layer.

This is the case even when it is used as a source of activating metal ions, since the quantity of activating metal ions involved in the electrochromic devices of the present invention is relatively small.

However, it will be appreciated that in such case, towards the lower limit of layer thickness, there may well be a danger of the supply of the metal ions being inadequate for the operation of the device.

In such cases, it will clearly be desirable to use an additional source of metal ions, as described in greater detail hereinafter.

In such devices the layer may typically be from 2 to 1000 micron in any application, for example 3 to 300 micron, favourably from 10 to 200 micron, e.g. about 40 to 180 micron, and preferably about 20 to 100 micron.

As for the electrochromic material and the electrodes (described hereafter), at lower thicknesses it will have to be applied to a support.

Such a support may be e.g. the anode or the cathode and/or the electrochromic material (any of which may in turn be supported as hereinafter described), and in such cases casting a precursor onto a support and forming the matrix in situ as described hereinbefore may be desirable.

In other lamelliform/multilaminar devices, in particular window sheets which are curved during the manufacturing process, it is clearly advantageous and preferred that the Solid Electrolyte be as resistant as possible to rupture in such processing, and the Solid Electrolyte layer may be at the higher end of the above ranges, e.g. 250 to 750 micron, but favourably 70 to 300 micron.

The significance of the surface tack of the Solid Electrolyte has been indicated hereinbefore.

The tack may be varied by varying a number of physical parameters of the matrix, including any polar aprotic liquid content, the number of side-chains in each molecule of the matrix polymer, and the spatial distribution of any cross-linking within the polymer matrix, in particular as between the surface and the bulk of the Solid Electrolyte.

Considering each of these parameters in turn:

We have found that in respect of the liquid content it is necessary to strike a balance between optimal values for two desiderata, viz between optimal values for the tack and the tensile strength and tear resistance of the Solid Electrolyte, which tend to depend in opposite senses on the liquid content.

A liquid content of 5 to 50 wt % of the total electrolyte, in particular 5 to 20 wt %, is preferred.

We have found that in respect of the number of polar side-chains per matrix polymer molecule, it is necessary to strike a balance between optimal values for two desiderata, viz between optimal values for the tack and the conductivity of the Solid Electrolyte, which within the range of side-chain content of practical interest tend to depend in opposite senses on the polar side-chain content.

A side-chain content of 5 to 40 mol % of the matrix polymer, in particular 15 to 30 mol % is preferred.

We have found that in respect of the spatial distribution of any cross-linking within the polymer matrix, in particular as between the surface and the bulk of the Solid Electrolyte, it is preferred that the bulk of Solid Electrolyte is cross-linked, inter alia for the beneficial effect on the tensile strength and tear resistance of the Solid Electrolyte, but that the surface is essentially uncrosslinked and liquid-like for good tack.

The surface layer of uncrosslinked material suitably is 5 to 200 micron thick, e.g. 10 to 50 micron and/or forms 5 to 20 wt% of the total matrix material As noted hereinbefore, this may be achieved e.g. by ensuring the presence of a small amount of oxygen at the surface in cross-linking, and/or an essentially uncrosslinked discrete matrix species in the surface of the Solid Electrolyte.

Where the device does not contain a reactive metal, e.g. lithium, polymers with some side-chains ending in OH or COOH groups may be used.

These may advantageously have good adhesion to e.g. an adjacent metal oxide electrochromic material of the device.

The manner in which these polymers may be produced is described hereinbefore.

The electrochromic material in the device of the present invention generally comprises a material capable of reversibly passing between two states by reversibly receiving or giving up ions or electrons.

This occurs when the ions or electrons are caused to migrate into or out of the electrochromic material by application of an electric potential across the device.

The material undergoes a change in e.m.r. absorbance, generally resulting in a visible change as the concentration of ions or electrons therein varies.

The electrochromic (e.g. visible) change may be a change in absorption spectrum, e.g. from one colour to another, or a change from transparent to coloured, from transparent to translucent or from translucent to opaque, at the operational wavelengths, or the change may be the greater or lesser degree of e.m.r absorption, e.g. a change in intensity of one colour.

Thus the material may:

a) reversibly receive guest ions such as the ions corresponding to the cations of the highly ionised salt of the Solid Electrolyte, e.g. alkali metal ions,
b) reversibly give up guest ions,
c) reversibly receive electrons to be reduced (i.e. be a 'potential oxidant')
d) reversibly give up electrons to be oxidised (i.e. be a 'potential reductant')

It will be appreciated that pairs of materials of types a) and b) and c) and d) respectively will often be the two complementary states of the material in the device.

The actual electrochromic material in the device provided in the present invention will often conveniently be the more stable of the two in ambient rest conditions.

As will be seen hereinafter, this is particularly the case where one oxidation state of a pair of materials c) and d) is thermodynamically more stable than the other.

The electrochromic material of type a) may often suitably comprise a higher oxidation state transition metal compound The best known examples of such compounds include the so-called tungsten bronzes and related compounds (often oxides).

In the latter, the host material is a transition metal chalcogenide, such as an oxide, sulphide or selenide, e.g. $V_2O_5$, $Nb_2O_5$, $MoO_3$, $WO_3$, $IrO_2$, $CuO$, $CuS$, $Ni_2O_3$ or any plurality thereof, e.g. in mutual solid solution, optionally together with $TiO_2$ and/or $ZrO_2$, or optionally doped with interstitial rare earth metal atoms/ions, e.g. of Ce or La; or a transition metal complex salt, such as iron (III) ferro (II) hexacyanate (Prussian blue).

Such materials are capable of reversibly receiving alkali metal ions (e.g. lithium), or copper (I) or silver (I), with a corresponding colour change, e.g. from colourless to blue in transmission.

The relevant colour intensity is generally dependent upon the concentration of the guest metal ions in the host material.

The electrochromic effect may be achieved by placing the material in contact with an electrode in the present device, between the electrode and a source of relevant metal ions (e.g. the Solid Electrolyte or a metal ion source/sink as described hereinafter).

On charging the electrode such that it is a cathode, alkali metal ions migrating to the cathode will diffuse into the electrochromic material.

Reversal of the potential will reverse the flow of alkali metal ions, and hence bleach the coloration of the electrochromic layer.

The electrochromic material of type b) may of course suitably comprise a type a) higher oxidation state transition metal compound, containing appropriate guest ions, as described above.

Such materials are described further hereinafter in respect of optional ion source/sink materials.

The electrochromic material of type c) may suitably comprise a higher oxidation state transition metal compound.

Such a compound is one in which the transition metal is in a higher oxidation stage from which it may be reduced to a lower oxidation state i.e. a potential oxidant, e.g. a transition metal (complex) chalcogenide such as an (often hydrated) oxide, e.g. hydrated $Ni_2O_3$, $Co_2O_3$, $Mn_2O_3$ or $IrO_2$.

The electrochromic material of type d) may suitably comprise a lower oxidation state transition metal compound. Such a compound is one in which the transition metal is in a lower oxidation stage from which it may be oxidised to a higher oxidation state i.e. a potential reductant.

It may often be complementary to the above type c) materials.

For example, it may be a transition metal (complex) chalcogenide such as an (often hydrated) oxide, e.g. hydrated NiO, CoO or MnO.

By way of example, an electrical potential may applied across the present device in such a manner as to remove electrons from a transparent layer of hydrated NiO electrochromic material In such case, the oxide is oxidised to form the more coloured trivalent nickel oxide, $Ni_2O_3$, which darkens the layer as viewed in the device.

Bleaching of the material occurs when the polarity of the applied potential is reversed The electrochromic material is generally present in a layer in the present device as particles of less than 40 micron grain size. Preferably, known techniques of manufacture are used to produce amorphous or polycrystalline particles of a mean grain size of up to 0.5 to 50 nm; these are described in GB-A 2081922.

Such preferred particles have the advantage of tending to keep the layer of electrochromic material optically clear and colourless.

The electrochromic material may also consist essentially of one or more of the foregoing materials, or it may comprise a solid dispersion of the electrochromic material(s) in a matrix of a solid electrolyte, preferably the Solid Electrolyte.

Typical and preferred solid electrolytes within such an electrochromic material include those so described for the Solid Electrolyte hereinbefore.

The electrochromic material (when typically present in the device in the form of a layer) may be of any thickness provided it is cohesive and continuous.

It is clearly advantageous and preferred that the layer of electrochromic material be as thin as possible provided that the device does not rely on conduction in the plane of the material.

The layer of electrochromic material may typically have a thickness e.g. in the range of 5 to 1250 nm, e.g. from 30 to 750 nm thick, such as 100 to 550 nm. It will be appreciated that at the lower thicknesses the electrochromic material will have to be applied to a support.

The device may operate in transmission or in reflection at any appropriate wavelength. At least part of one of the two electrodes is therefore transparent or translucent at that wavelength Typically, the device will operate at visible wavelengths, ie the electrochromic change will be a visible change.

Where the device operates in transmission, at least part of both electrodes will be transparent or translucent, and these two parts will generally be in register.

Where the device operates in reflection, at least part of only one electrode need be transparent or translucent at the appropriate (typically visible) wavelength.

This is the case provided the other electrode has an internal reflective surface, generally disposed opposite the transparent or translucent part.

In one alternative, as noted hereinafter, both electrodes are partially transparent or translucent as for the transmissive device.

However, one such 'window' is backed by a reflective surface of an envelope for the device assembly (e.g. a 'silvered', white or coloured surface).

As noted hereinbefore, the thin layer-form of the present device is often arranged in the following order of layers with consecutive layers in mutual electrical contact:

first electrode,
electrochromic material,
Solid Electrolyte,
optional electron/ion source/sink, and second electrode.

Subject to the above limitations as to transparency and/or translucency and the special case of an ion source anode described further below, the two electrodes may generally be made of materials selected from the same list of suitable materials.

Any material of a suitably high conductivity and the desired optical properties may be used in the electrodes of the present device.

Transparent or translucent electrode layers may suitably be formed as a thin coating of a transparent or translucent electrically conductive material at a loading to give a sheet resistance of less than 20 ohm per unit area.

Suitable transparent conductive materials for such electrodes include certain metal oxides and mixed oxides, such as indium and tin oxides, and mixtures and mutual solid solutions thereof, e.g. indium tin oxide.

Suitable transparent conductive materials also include fluorine-doped tin oxide;
optionally aluminium-doped zinc oxide, cadmium tin oxide and antimony tin oxide; and
mixtures and solid solutions thereof, both mutually and/or with tin oxide and/or indium oxide.

The electrode material may as an alternative comprise a plastic which is transparent/ translucent at the operating wavelengths.

For example, the first electrode material may as an alternative comprise an anion (p−) doped conductive polymer where the anion may be the same as that of the highly ionised salt in the Solid Electrolyte.

Such a first electrode polymer may be e.g. $AsF_6$-doped poly-p-phenylene.

The skilled man will appreciate which of such polymers may be used at visible wavelengths, and any limitations on the permissible thickness of a layer of such materials.

As another alternative, the first electrode may comprise a neutral polymer with an extended delocalised electron system which on reduction gives a salifiable ("conductive") polymer which is doped by the incorporation by diffusion in use of cations from the highly ionised salt of the Solid Electrolyte.

Such a first electrode polymer may for example be reduced poly-(p-phenylene) n-doped with $Li^+$ cations.

The second electrode in the device may similarly comprise a potentially salifiable ('conductive') polymer.

Such an second electrode polymer may in particular be one with an extended delocalised electron system, for example poly(p-phenylene) or polyacetylene, containing e.g. an alkali metal as a dopant.

Often the second electrode material may be or comprise the same element as any alkali metal cation of the highly ionised salt in the Solid Electrolyte.

Again, the skilled man will appreciate which of such polymers may be used at visible wavelengths, and any limitations on the permissible thickness of a layer of such materials.

Suitable electrode materials which are transparent at visible wavelengths also include: certain metals, such as gold, silver and copper; mixtures and alloys of the foregoing metals; and any of such metals and their alloys, in admixture or mutual solid solution with the abovementioned oxide materials for the electrodes; all as conductive thin transparent layers or films.

Alternatively where the electrode does not have to be transparent or translucent at visible wavelengths, the electrode may comprise a thick layer of a metal such as aluminium.

Often such an electrode comprises a corrosion-resistant metal, such as chromium or nickel.

There are a number of embodiments of the electrochromic device of the present invention which may be used to achieve an electrochromic (e.g. visible) change in operation.

In all such embodiments, however, a reversible source or sink as appropriate of suitable activating species, be they ions (or their atomic precursors) or electrons, is needed to supply or accept all of the ions or electrons necessary to bring about the desired (e.g. visible) change in the device when activated.

Although conduction through the Solid Electrolyte occurs by ionic migration, conduction through the rest of the device is electronic.

Where the electrochromic material in the device is activated by electrons, these may be supplied to the electrochromic material by any convenient pathway.

Subject to the provision of a relevant pathway, any conductive component of the device may act as an electron source/sink under the application of a potential across the component electrodes, and there is no need for a specific source/sink component.

The electrochromic material in the present device is however often one activated by the receipt of ions, e.g. metal ions, such as an oxide bronze or related material.

In such case where the activating metal ion species is an alkali metal (e.g. lithium), silver or copper, the second electrode (the anode) remote from the electrochromic material layer may comprise a corresponding metal to act as a source for the activating ions.

The activating ions for the electrochromic material may conveniently be the cations of the ionised salt in the Solid Electrolyte, e.g. alkali metal ions, in particular lithium ions.

Where the activating ions are alkali metal ions (and the Solid Electrolyte optionally but conveniently contains the same cations), there is a prejudice in the art against making the second electrode out of the corresponding alkali metal, because of the supposed inconvenience of the known reactivity of the free metal. However it is believed to be possible in the present devices conveniently to make the second electrode of an appropriate source/sink for the activating species, such as alkali metal, e.g. lithium, to furnish the required ions.

Thus for example in such an embodiment, the second electrode may suitably be or comprise not only silver or copper, but alternatively an alkali metal such as Na, K or preferably Li.

An alkali metal may be comprised as an alloy component for example in a lithium aluminium alloy (in a reflective device) or as a dopant in a potentially salifiable ('conductive') polymer, in particular one with an extended delocalised electron system, for example poly(p-phenylene) or polyacetylene.

Such second electrode material may be or comprise the same element as any alkali metal cation of the highly ionised salt in the Solid Electrolyte.

Where the transmission properties of the electrode or any part of it are not important (as described above) layers of any of the above materials which are so thick as not to transmit e.m.r. at the operating (e.g. visible) wavelengths adequately may be used as electrode materials.

Other (e.g. visibly) opaque but sufficiently conductive materials may also be used for such electrodes, in particular where the one electrode acts as a source/sink for activating ions, e.g. an second electrode acts as a metal ion source.

Thus, ferrites comprising appropriate metal ions corresponding to activating ions, e.g. for oxide bronze and related electrochromic materials, may be used as visibly opaque second electrode materials, e.g. a lithium ferrite may be used.

Such an electrode may also form a reflective layer.

For example, such an second electrode may be a polished layer of aluminium containing 3 to 4 atomic percent dissolved lithium.

Other suitable electrode materials which may be used in a similar manner are known to the skilled man.

These include metal alloys and compounds inter alia; many suitable materials are described e.g. in U.S. Pat. No. 3971624.

In view of the possibility of the foregoing source/sink electrodes, the present invention, in one embodiment of its first aspect, provides an electrochromic device as hereinbefore defined in which one electrode is capable of furnishing ions to, or receiving ions from, the electrochromic material under the influence of an electrical potential.

The electrical potential is conveniently applied across the electrodes of the device.

In the general device of the present invention, each electrode may be of any thickness provided it is cohesive and continuous, and it is clearly desirable that it be as thin as possible.

That is of course provided that the device does not rely on conduction in the plane of the electrode.

Additionally, in any part where it is required to be transmissive at the operating (e.g. visible) wavelengths, it must clearly be thin enough to be transparent or translucent at those wavelengths.

The size of the second electrode may vary between wide limits, and it may be small, e.g. a thin layer.

This is the case even when the second electrode is used as a source of activating metal ions for the electrochromic material (as described in greater detail elsewhere herein), since the quantity of activating metal ions involved in the electrochromic devices of the present invention is relatively small.

However, it will be appreciated that towards the lower limit of the layer thickness, there may well be a danger of the supply of the metal ions being inadequate for the operation of the device, In such cases, it will clearly be desirable to design the device routinely to avoid this potential problem.

Where it has to be transmissive at visible wavelengths, each electrode may typically be from 5 to 2500 nm thick, for example 50 to 250 nm, depending however on its conductivity, as noted hereinbefore. It will be appreciated that such an electrode will have to be applied to a support, for example a transmissive device wall and/or the Solid Electrolyte. It may often be applied to the support e.g. by vapour deposition.

Suitable transmissive device walls are described in further detail hereinafter.

Where it does not have to be transmissive, each electrode may typically be from 0.5 to 2500 micron thick, for example 5 to 250 micron.

It will be appreciated that at lower thicknesses the electrode will have to be applied to a support, for example a device wall and/or the Solid Electrolyte as noted above.

It may even also be necessary to apply an electrode to the support e.g. by vapour deposition.

Where the electrode does not have to be transmissive at visible wavelengths, such a support may be or comprise a conductive mesh or foil current collector layer in contact with the electrode.

Such a mesh or foil may for example be of a metal, such as nickel, equipped with at least one terminal.

As noted above, in all embodiments of the present devices where the electrochromic material is activated by metal ions, a reversible source or sink as appropriate of suitable activating ionic species is needed to supply or accept all of the ions or necessary to bring about the desired electrochromic (e.g. visible) change in the device when activated.

In some ion-receiver/donor electrochromic systems previously proposed for use in displays, the reversible source/sink for the relevant ions is often necessarily a further component of the device.

Such a source/sink may be e.g. in the form of a second body (often a layer) comprising the complementary electrochromic material in the receiver-donor pair a)-b) described hereinbefore.

This complementary source/sink material will vary (e.g. visually) in opposition to that of the operational electrochromic material. In one of its two states, such a material will generally itself have a significant and usually inconvenient optical density.

If the two materials are identical, it may be difficult to achieve significant electrochromic (e.g. visible) change.

Other suitable sources such as alkali-metal ferrites as a source of alkali metal ions (where the electrochromic material is an oxide bronze or related electrochromic material) are visibly opaque and non-reflective; this may be inconvenient in many types of desired visible change.

As noted above, in embodiments of the present devices where the activating entities are ions, the need for a separate source/sink may advantageously be avoided by the use of an embodiment of the Solid Electrolyte comprising a salt of the relevant activating ion and optionally a second electrode which comprises atoms corresponding to the activating ions.

In particular an embodiment may be used where the salt is one of those recited in the definition of the Solid Electrolyte hereinbefore, and in which any such second electrode comprises the atoms corresponding to the cation of that salt.

Thus, e.g., a Solid Electrolyte in which the ionised salt is an alkali metal salt may be used as an alkali metal source/sink for an oxide bronze or related electrochromic material.

The corresponding electrochromic device may optionally be provided with an second electrode which comprises the corresponding alkali metal.

The Solid Electrolyte has the additional advantages for many applications of being transparent, and not being electrochromic in the visible spectrum.

The latter advantage means that the two states of the material (full and depleted of the relevant ions) have e.m.r absorption bands such that the passage of electrons or ions to or from the material has negligible visible effect on the material.

However, if desired or necessary, the device of the present invention may comprise a separate ion source/sink material, e.g. comprising a complementary or other material as described above.

Accordingly, in one embodiment of its first aspect, the present invention provides an electrochromic device as hereinbefore defined comprising a further material between the second electrode and first electrode which is capable of furnishing electrons or ions to, or receiving ions or electrons from, the electrochromic material under the influence of an electrical potential applied across the electrodes.

In this type of embodiment when used at visible wavelengths it is preferred that the source/sink material is
  a) not opaque in the visible spectrum (although it may be opaque in a reflective device if itself reflective), and
  b) not one which exhibits a significantly similar electrochromic effect as the electrochromic material.

Examples of such materials include an alkali metal, in particular lithium, ion source which comprises $V_2O_5$, in particular a solid solution of $MoO_3$ and $V_2O_5$, e.g. in a weight ratio of 1:3 to 3:1, favourably 1:2 to 2:1, e.g. about 1:1 w/w.

Conversely of course, this solid solution alone may act as a sink host material for accepting alkali metal ions.

In a sufficiently thin layer such a material is not opaque in the visible spectrum (as is necessary for use at visible wavelengths, since it is not reflective)

As for the other components of the present device, the source/sink material will generally be in the form of a layer, the thickness of which may lie e.g. in the range of 10 to 1250 nm, e.g. 20 to 900 nm. Such a layer of source/sink material is preferably about 140 to 600 nm thick.

Although the foregoing type of source/sink material is preferred, it is possible to use materials for this purpose which do not fulfil these criteria.

In one such arrangement, the source/sink material is electrochromic, but is a different material from the electrochromic material as defined hereinbefore, e.g. it has a significantly different main e.m.r. absorption band from that of the electrochromic material.

In such an arrangement the net effect of the transfer of ions between the source/sink and the electrochromic material is an overall electrochromic (e.g. visual) change in the relevant electrochromic device.

Suitably different materials will either be apparent to the skilled man, or may be readily determined by routine trial.

However, by way of example, the electrochromic material may be a molybdenum oxide or tungsten oxide bronze or related electrochromic material, which is capable of being activated by lithium ions. When such a material (which is colourless when not activated), is doped with lithium ions, it has an absorption maximum is in the infra-red, producing a blue coloration in the activated (and otherwise) colourless material.

Lithium-doped vanadium pentoxide has an absorption maximum towards the ultra-violet, producing a pink coloration in the material. Incorporation of this vanadium oxide in solid solution into a lithium-doped molybdenum oxide bronze will tend to move the absortion maximum of the lithium-containing material towards the ultra-violet, producing a pink coloration in the material.

This makes vanadium pentoxide and such solid solutions suitable as a lithium ion source material for use with a metal oxide bronze or related electrochromic material.

In another much less prefered arrangement within this embodiment, the source/sink material comprises a material which, with the electrochromic material, forms a complementary pair of electrochromic materials as described hereinbefore. Both materials are in the form of a layer.

In this arrangement, use is made of the fact that the degree of electrochromic (e.g. visible) change of the electrochromic material (e.g. the density of coloration) by a given quantity of the activating ions varies with the thickness of the layer of the material in the direction in which it is viewed.

The layers of the electrochromic material and the source/sink material are of sufficiently different thicknesses in a common direction of viewing for the two layers to be operating at different efficiencies of e.m.r. absorption for the same quantities of ions in the respective layer.

The thickness of the thinner (generally the source/sink) layer may lie e.g. in the range of 5 to 100 nm, preferably 20 to 70 nm, e.g. about 40 nm.

The thickness of the thicker (generally the electrochromic material) layer may lie e.g. within the ranges given hereinbefore in relation to the same material, ie within 5 to 1250, e.g. 200 to 450 nm.

In some arrangements where two such layers are used to produce a variation in optical transmission at the operating wavelengths, potentials may be applied to the device which control the variation without transferring all the relevant ions. It is however preferred that substantially all the activating ions are so transferred.

The device assembly described above is desirably sealed into an insulative envelope, at least part of which is transparent or translucent at the operating (e.g. visible) wavelengths. Such a sealed-in device may operate in transmission or in reflection.

In the latter case at least part of the envelope will usually have an internal reflective surface, generally disposed opposite the transparent or translucent part. The envelope is preferably a moisture and air impervious one.

Where the electrochromic device operates in transmission and is in a preferred thin-film embodiment, the device assembly may be sandwiched by two sheets, at least one of which is transparent or translucent at the operating wavelengths. These sheets may be rigid, and for operation at visible wavelengths may be made for example of a conventional silicate-based glass or a rigid plastic. Suitable plastics for such sheets, again at visible wavelengths, include polyesters, polycarbonates, and acrylics.

The sheets may be conventionally sealed at the edges e.g. by an epoxy resin, hot melt adhesive or thermoplastic, e.g. a synthetic rubber.

In another embodiment the sheets may be flexible, e.g. thermoplastics films, of for example a polyester such as polyethylene terephthalate, or a polyethersulphone, the edges of which are heat-sealed to enclose the assembly.

The device may also form part of a conventional electrical circuit, be mounted on a conventional circuit substrate.

Such a device may be sealed to the substrate by a thermoplastics or thermoset plastics cover, which is transparent or translucent at least in part.

Such a device may also be sealed to the substrate by an encapsulation layer of transparent or translucent silica. Where the envelope does not have to be transmissive at visible wavelengths, it may be a coherent non-porous ceramic, which may conveniently be alumina, silica, or a nitride.

Electrical contacts to the two electrodes pass through and are sealed into the envelope, generally through the edge seals described above.

One embodiment of the electrochromic device is that in which the components are in a plurality of overlying layers effectively of a number of device assemblies in a multilayer structure.

In this case, the device is effectively a multilayer of several device assemblies in bipolar series cascade.

In such a multilayer, only one electrode layer is required per device, since a single electrode (generally transmissive at visible wavelengths) is sandwiched by the other components of adjacent device assemblies.

Such an electrode serves on one face as the first electrode of one assembly and on the other face as the second electrode of the adjacent assembly.

In another embodiment, the device effectively is a similar multilayer stack of several such device assemblies, omitting all the electrodes except the two outermost.

In any such multilayer devices, the layers of electrochromic material and/or the electrodes do not have to be in register through the stack and may be segmented over the field of view. This conveniently and advantageously provides the possibility of a display device having a number of complementary display segments.

In general, the outer faces of any such multilayer assemblies are covered (to seal the electrochromic device) with a layer of one of the abovementioned sealant materials.

Typical operating voltages of the present device are in the range of 0.1 to 4 V, e.g. 2.5 to 4 V.

The device may be constructed in a form which gives rapid response to relatively small applied potentials of the order of 1 to 3 volts.

For devices of the present invention operating with the electrochromic ion insertion systems of the types discussed above, a charge of 40 to 250 coulombs/m$^2$ is normally required to produce the desired visual change.

Consequently, current densities are of the order of 0.5 mA/cm$^2$ and below.

The electrochromic elements of the present devices described hereinbefore are able to accept charges of the above order in a practical operational write time (ie visual change response time) without any significant deleterious side-effect, e.g. plating-out of an activating metal rather than its solution in the host.

The write time of the present electrochromic device may (desirably) be reduced by optimising a) the grain size and layer thickness of the electrochromic material, and
b) as necessary the layer thickness of the Solid Electrolyte,
c) the electrode conductivity, e.g. by routine trial.

Devices of the present invention may serve a variety of functions.

Such functions will determine the nature of the materials used for the various (generally lamelliform) components.

Such functions will determine in particular which of the components are to be made transparent and at what operating wavelengths and which if any are to be made opaque at those wavelengths.

Thus, devices according to the invention may serve as visible or non-visible variable transmission optical devices or as various kinds of display device or data recording device.

The operation of the device of the present invention in reflection from an electrode or envelope internal surface is described hereinbefore.

In one alternative reflectance form of the thin-layer device, the layer of Solid Electrolyte is loaded with suitable dispersed solids to be opaque and/or reflective at visible wavelengths.

Such a device is arranged so that it is viewed in use with the Solid Electrolyte to the rear of the layer of electrochromic material, so as to provide a visually contrasting background to the electrochromic material when the latter is coloured in operation.

Depending on the specific desired nature of the electrochromic device, the electrolyte may be rendered opaque and/or reflective by loading it with a suitable dispersed pigment or reflective material such as 5% v/v with respect to the total electrolyte of TiO$_2$ powder.

Amongst transmissive devices, for example, each window of a vehicle, such as a car, may comprise a lamelliform device of the present invention, itself comprising a layer of electrochromic material The devices may be electrically connected in an electrical circuit to the vehicle battery and to a control device, such as an air-conditioning system, a thermostat or preferably a photosensor for sunlight.

The circuit will be arranged such that the devices are darkened in hot or more aptly in sunny weather to prevent a greenhouse effect inside the vehicle.

The system may be provided with a manual override e.g. to allow the occupants to darken the windows for privacy.

Similarly, in a related reflectance device, photosensors may be used to detect glare from vehicle headlights from behind, and immediately darken an electrochromic rear view mirror.

As noted hereinbefore, in a preferred embodiment of the electrochromic device of the present invention the components are in the form of layers.

Such layers may of course be continuous over the field of view of the device, e.g. in vehicular variable transmission windows and variable reflectance mirrors.

The skilled man will however appreciate that, e.g. in the abovementioned electrochromic display devices, any such layers may desirably be discontinuous and/or segmented over the field of view, as noted hereinbefore in relation to multilayer devices.

Where the electrochromic device of the present invention is multilaminar (as hereinbefore defined) e.g. in the form of a sheet, it may be made up by conventional layering/coating techniques, as exemplified by the following manufacturing techniques.

The Solid Electrolyte makes it particularly suitable for example for production of the device of the present invention by conventional lamination.

Where the electrochromic device is to operate in transmissive mode, a sheet which is transparent or translucent at the operating wavelengths, e.g. for use at visible wavelengths a glass pane or a thermoplastics film, 0.15 to 4 mm thick, is coated conventionally on one face with a transparent conductive electrode material, e.g. a thin layer of indium tin oxide. This is typically of a thickness and other properties described hereinbefore. (It will be appreciated that the same starting layers may be used in the fabrication of a visible wavelength reflective-mode device where the reflection is to be through these layers from the far side of the device, e.g. from the other electrode.)

Alternatively, the electrochromic device may be in the form of a reflective visible display With reflection from the side of the device nearest to the electrochromic layer.

In this case as a starting point a reflective nickel foil, sheet or layer electrode may be laid down (e.g. by evaporation) on, or secured to, a glass pane or an insulative thermoplastics web.

In either type of device, a thin layer of an electrochromic material is then deposited on the electrode-coated face of the sheet.

Thus, an oxide bronze or related electrochromic material of a transition metal in a higher oxidation state may be deposited, e.g. as described in GB-B 2081922, typically by evaporation at a controlled rate.

Alternatively, such an oxide bronze or related electrochromic material or an electron-activatable oxide of a transition metal in a higher oxidation state may be applied by (optionally reactive) sputtering, e.g. magnetron sputtering of respectively tungsten or nickel metal in the presence of oxygen.

In the fabrication of e.g. an electrochromic display device of the present invention which comprises any discontinuous and/or segmented layer, various stages of mechanical masking appropriate to the conformation of that layer may be required during the deposition of that layer, as will be clear to the skilled man.

Thus, various patterns, e.g. a segmental display, may be built up using metal masks to delineate any electrode and/or the electrochromic material.

Similarly, it is often generally convenient to mask an area of the electrode surface effectively to form in the product a lug of the electrode projecting beyond the layer of elecrochromic material.

An electrode lead, e.g. adhesive copper tape, is attached conventionally to the electrode layer of any of the foregoing types, e.g. it may be applied to the exposed lug(s) referred to above.

In the next stage, the Solid Electrolyte is deposited upon the layer of electrochromic material.

The Solid Electrolyte may be added as a discrete component into the device of the present invention, or it may be made in situ on the layer of electrochromic material.

In the former case, it may typically be cast and optionally cross-linked into a sheet or thin film of Solid Electrolyte or an uncrosslinked precursor thereof ex situ, and the product sheet or film applied to the electrochromic layer, and as necessary further processed in a device of the present invention For example, an uncrosslinked precursor may be cross-linked in situ, typically in the fully fabricated device.

Alternatively, the Solid Electrolyte is typically formed (as noted hereinbefore) by a) forming the matrix in situ b) incorporating the highly ionised salt in the matrix or a precursor thereof, and c) optionally introducing the aprotic liquid into the matrix or a precursor thereof.

The steps a) and b) and optionally c) are preferably carried out in the order b) and optionally c), using a matrix precursor, and then a).

Thus, typically a fluid precursor of the Solid Electrolyte comprising the matrix or a precursor thereof, the salt and any aprotic liquid, as appropriate with a cross-linking agent is made up in the first step b) and optionally c), and is applied to the above product, e.g. using a doctor blade, followed in step a) by any necessary solvent removal and/or curing, although as also noted hereinbefore curing may often be carried out in the fully fabricated device.

(The precursor may be: a solution or dispersion of the Solid Electrolyte in for example acetonitrile; (often) a precursor comprising a cross-linkable precursor of the Solid Electrolyte polymer; or (less often) a polymerisation precursor of the Solid Electrolyte polymer.)

In another less usual option, steps c) is effected after steps b) and a) in that order, i.e. in the final step c) the aprotic liquid is introduced by exposing the product Solid Electrolyte (or cross-linkable precursor) in situ on the electrochromic material layer to the vapour of the liquid.

If the device is to comprise an optional ion source/sink as described hereinbefore, a layer of that material is then put into contact with the layer of Solid Electrolyte/precursor.

This is often most conveniently effected by depositing a thin layer of a source/sink material on an inner electrode-coated face of a second outer sheet of transparent or translucent material which forms the second electrode of the device.

Where such a source/sink material is an oxide of a transition metal in a higher oxidation state doped with the activating species for the device, e.g. vanadium pentoxide doped with lithium, the oxide may be applied by (optionally reactive) sputtering, e.g. magnetron sputtering of vanadium metal in the presence of oxygen. The oxide may be doped electrochemically, e.g. by making the electrode the cathode in a lithium salt solution electrolyte.

Again, mechanical masking appropriate to the desired conformation of the source/sink layer may be required during the deposition of that layer, as will be clear to the skilled man.

The electrode is then contacted with a lead, by placing the latter on the electrode, as described above for the first electrode bearing the layer of electro chromic material, to form an electrode sub-assembly.

This sub-assembly is then laid upon the rest of the device with the optional ion source/sink material on the electrode in contact with the Solid Electrolyte/precursor.

Typically the second electrode layer and sheet will be the same as the first electrode layer and sheet respectively, as described above.

In a transmissive device such a sheet is conveniently the same as that forming the first electrode, as described hereinbefore.

Where no source/sink material is present, an electrode sub-assembly without that material is made up as above, and this sub-assembly is then laid upon the rest of the device with the second electrode in contact with the Solid Electrolyte/precursor.

As a (less usual) alternative to the foregoing methods, the source/sink material (if present) may be deposited on the Solid Electrolyte or its precursor, and/or the second electrode may be deposited on the Solid Electrolyte or its precursor or the source/sink material if present, by any of the aforementioned methods which may be applicable.

The order of all the foregoing steps may of course be reversed as desired.

In a second variant, the above procedure is followed up to the deposition of the Solid Electrolyte/ precursor layer, where a Solid Electrolyte/precursor layer of only half the desired final thickness is laid down.

A second glass or plastics layer is similarly prepared, bearing the second layer electrode layer of e.g. indium tin oxide.

If the device is to comprise an optional ion source/sink as described hereinbefore, a layer of that material is laid down upon the second electrode layer. A second layer of the Solid Electrolyte/ precursor is then laid down on the second electrode or the source/sink material layer as appropriate.

Again, this layer of Solid Electrolyte/precursor will be only half the desired final thickness of the Solid Electrolyte/ precursor in the present device.

The two Solid Electrolyte/precursor half layers are then conventionally bonded face-to-face preferably by lamination to form a transmissive device of the present invention.

A reflective device where reflection is from the side of the device furthest from the electrochromic material is made by depositing, by the techniques generally described above, transparent layers which are essentially the same as those described above.

However, the second electrode and/or the layer behind it will clearly be different.

Thus, as the first step, a layer which is reflective at the operating wavelengths is laid down; this layer may form the second electrode, and optionally the source sink for activating metal ions for the electrochromic material.

In the case of a device operating at visible wavelengths, this reflecting electrode may be e.g. nickel foil or polished aluminium foil or sheet.

In the same case, the electrode may act as an activating ion source/sink.

It may then be e.g. polished aluminium containing dissolved lithium as described hereinbefore, or polished lithium foil. (The device will of course have to be assembled in a dry inert atmosphere to preserve the reflectance of the last-named second electrode.)

An optional current collector, and any final insulator layer may then be applied in order.

Again, the order of these steps may be reversed if desired.

In a variant of the device, the process order is so reversed, and the backing to the second electrode (on which the whole of the device is built up) is a ceramic substrate for an electrical circuit of which the present device forms a part.

The final transparent layer in this variant may conveniently be an encapsulation layer of transparent silica, conventionally sealed to the substrate.

All the foregoing device assemblies with rigid outer sheets are preferably then subjected to lamination, in particular vacuum lamination.

In the latter, the entire system is evacuated and left to purge off gas, after which, still under the vacuum, the assembly is subjected to 5 to 15 bar pressure on its extended plane faces and a temperature of 25° to 100° C. between the flat steel pressure blocks of a mechanical press, in order to laminate it.

Alternatively, for assemblies with one or more flexible outer sheets may be subjected to ambient pressure heated roller lamination.

In a variant of the assembly process the device assembly before lamination comprises an uncrosslinked precursor of the Solid Electrolyte, optionally also containing a cross-linking agent/initiator, and this is cured in the lamination press.

Finally, in all the above embodiments the edge seal is made, e.g. using an epoxy resin or a hot-melt adhesive or a thermoplastic onto glass or ceramic.

Thus, in a further aspect the present invention provides a process for preparing a device of the present invention, characterised by in any order a) coating a electrochromic material which is capable of being activated by ions onto a first electrode as a thin film on a first support with the solid electrolyte of claim 1 or a precursor thereof, b) coating a material which is a source of the activating ions onto a second electrode as a thin film on a second support, c) contacting the solid electrolyte with the source material, d) hot-press laminating all the foregoing integers together, and e) optionally converting any precursor to the solid electrolyte.

An alternative method is useful where the outermost substrate layers are relatively rigid and separated by an edge seal (e.g. a window).

In this alternative method, a fluid precursor of the Solid Electrolyte comprising a polymerisation precursor of the Solid Electrolyte polymer (without a solvent) may be cast and polymerised and/or cross-linked into the Solid Electrolyte in situ in the device e.g. as a sheet or thin film.

In such a process the whole device is assembled without the Solid Electrolyte/precursor layer, generally as described above and typically with a space between an electrochromic layer and a non-contiguous electrode and/or optional sink/source material.

The fluid precursor is then injected into the space, typically via a temporary or sealable permanent channel of a size appropriate to the viscosity of the fluid in a thermoplastics edge seal.

This is followed by any necessary polymerisation and/or cross-linking.

The edge seal may be supplemented by an additional seal or replaced by an alternative one.

This variant has the advantages of not requiring solvent removal, a dry or clean room, handling of the film or any laminating process.

In common with electrochromic devices generally, the fabrication of the present devices needs to be carried out with care to achieve good performance in the product.

The present invention is illustrated by the following Examples and the accompanying drawing which illustrates an embodiment of the invention. The preparation and properties of uncrosslinked matrix precursors of the Solid Electrolyte, and any cross-linking of the precursor to form the Solid Electrolyte is illustrated in the following Descriptions

DESCRIPTION 1

Preparation and Use of an Ethylene Oxide (EO)/Methyl Digol Glycidyl Ether (MDGE)/Allyl Glycidyl Ether (AGE) Matrix Precursor (Uncrosslinked Terpolymer) (D1)

(Methyl digol glycidyl ether is of formula

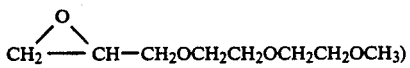

A catalyst was made following the technique of E J Vandenberg, Journal of Polymer Science Part A-1 Vol 7 Pages 525–567 (1969) as follows, all steps being carried out under an inert nitrogen atmosphere.

A 25% solution of $Et_3Al$ (Et means ethyl) in heptane at 0° C. was diluted with dry diethyl ether to a concentration of 0.5 moles per liter. The resultant solution was kept at 0° C., and water (0.5 mole/mole $Et_3Al$) Was added dropwise with stirring over 15 mins.

Acetylacetone (0.5 mole/mole $Et_3Al$) was added dropwise with stirring at 0° C. Stirring at 0° C. was continued for 15 mins The mixture was then stirred overnight at room temperature.

The following materials were charged to a stirred nitrogen purged 400 ml stainless steel autoclave; MDGE (19 ml), AGE (4 ml), and toluene (200 ml).

Catalyst as above (18 ml) and ethylene oxide (10ml, as a liquid) were then added whilst continuing to stir throughout and the temperature raised to 110° C. for 2 hours.

The hot viscous polymer solution produced was discharged into a 1 liter jar containing 5 ml methanol to inactivate the catalyst The autoclave was given two hot washes with a total of 500 ml toluene. The washings were bulked with the polymer solution and thoroughly mixed.

The polymer solution was rotary evaporated to a volume of 300 ml and cast in a polyester tray in a fume cupboard and left overnight for the solvent to evaporate.

The terpolymer was finally dried in a vacuum oven at 80° overnight to give 18.4 g of a sticky, rubbery product.

Molecular wt of the product was measured by gel permeation chromatography using lithium bromide in dimethylformamide as solvent.

MW=380,000

100 MHz NMR was used to measure the relative amounts of the three monomers incorporated in the final terpolymer which were:
77.9 mole % EO
17.5 mole % MDGE
4.6 mole % AGE i) Incorporation of Salt in Matrices/Matrix Precursors (Uncrosslinked Polymers); Measurement of Conductivity of Uncrosslinked Films a) 1 g of terpolymer (D1) was dissolved in 25 ml dry acetonitrile with stirring under a nitrogen atmosphere. Lithium triflate ($CF_3SO_3Li$) was added to the solution to give a ratio of 16:1 oxygen atoms present in the polymer to lithium ions. The solution was cast into a glass/polytetra-fluoroethylene mould.

The solvent was allowed to evaporate slowly under a stream of nitrogen.

The 200 $\mu$m film was dried at 80° under vacuum for 4 hours to remove any traces of water or solvent and its ionic conductivity over a range of temperatures was measured by standard AC impedance techniques as in Description 6.

Conductivity 20° C.=$2\times10^{-5}$ mho·cm$^{-1}$

The product film (E1) is used in Example 2.

ii) Incorporation of Salt in Matrix Precursors Uncrosslinked Polymers/Polymer Solutions); Forming the Matrix by Cross-linking the Precursor a) 1 g of terpolymer (D1) was dissolved in 25 ml acetonitrile with stirring and lithium triflate was added to give a 16:1 oxygen to lithium ratio. 1.0 wt % dry benzoyl peroxide was added to the solution which was cast as above into a 200 $\mu$m film under a stream of nitrogen.

The film was cross-linked by heating in a vacuum oven at 110° C. for 30 minutes

Conductivity 20° C. of product film (E2) determined as in Description 6=$3.5\times10^{-6}$ mho·cm$^{-1}$, b) An acetonitrile solution of terpolymer (D1) (85% w/w). lithium triflate (13% w/w) and benzoyl peroxide (2% w/w), was cast into a film, and the film was cured, as in a) above to give a 50 $\mu$m thick film (E3).

iii) Introducing the Liquid into the Matrix; adding Propylene Carbonate (PC)

Dry propylene carbonate was placed in the bottom of a dessicator and molecular sieve added to it.

The dried cross-linked film (E2) from ii) a) above was placed in the vapour space above the liquid for an appropriate time at a total pressure of 1 to 2 mm of mercury at room temperature In general about 25% of the propylene carbonate is taken up per hour based on the weight of the polymer.

This rate is essentially constant for at least four hours.

Solid Electrolytes (E21) to (E23) were produced in this way.

The following liquids were used over a range of liquid loadings to produce the following Solid

| Electrolytes: | |
| --- | --- |
| Sulpholane | (E24) and (E25) |
| Methyl digol carbonate | (E26) and (E27) |
| N-methylpyrrolidone | (E28) and (E29), |

The dried cross-linked film (E3) from ii) b) above was similarly treated with PC to a 50% weight increase to give Solid Electrolyte (E30).

All these Solid Electrolyte films were easy to handle and adequately dimensionally stable.

The films were kept dry and are used in the process of Example 7.

DESCRIPTION 2 i) Incorporation of Salt in Matrices/Matrix Precursors (Uncrosslinked Polymers/Polymer Solutions)

a) A solution of terpolymer (D1) (10 g) and dry lithium triflate (2.2 g) dissolved in dry acetonitrile (50 ml) was charged to a PTFE tray in a polyethylene bag.

The solvent was evaporated under nitrogen for 24 hr, to produce a film (E4) approximately 1 mm thick, which could be readily handled in a dry inert environment, and was used in Example 2.

b) A solution of terpolymer (D2) from Description 3 hereinafter (1 g) and dry lithium triflate (0.22 g) dissolved in dry methyl formate (10 ml) was charged to a fluorinated EP sheet (100 micron thick) under nitrogen, and a doctor blade was drawn across the sheet 500 micron above it.

The solvent was evaporated to give a film (E5) approximately 50 micron thick, which could be readily handled in a dry inert environment, and was used in Example 2.

c) A solution (E6) of terpolymer (D.1) (1 g) and dry lithium triflate (0.22 g) dissolved in dry acetonitrile (10 ml) was used in Examples 3 and 4.

ii) Incorporation of Salt and Cross-Linking Initiator in Matrix Precursors (Uncrosslinked Polymer Solutions)

A solution (E7) of terpolymer (D1) (1 g) and dry lithium triflate (0.22 g) and dry benzoyl peroxide (0.02 g) dissolved in dry acetonitrile (10 ml) was used in Examples 5, 6, 9 and 11.

iii) Incorporation of Salt, Liquid and Cross-Linking Initiator in Matrix Precursors (Uncrosslinked Polymer Solutions)

A solution (E8) of terpolymer (D1) (1 g) and dry lithium triflate (0.3 g), propylene carbonate (0.3 g) and dry benzoyl peroxide (0.02 g) dissolved in dry acetonitrile (10 ml) was used in Examples 7 and 8.

DESCRIPTION 3

Preparation of an Ethylene Oxide (EO)/Methyl Digol Glycidyl Ether (MDGE)/Allyl Glycidyl Ether (AGE) Matrix Precursor (Uncrosslinked Terpolymer) (D2)

The following materials were charged to a stirred nitrogen purged 2 1 stainless steel autoclave; MDGE (36 ml), AGE (13.2 ml), and toluene (500 ml), catalyst as in Description 1 above (38 ml) and ethylene oxide (132 ml, as a liquid), and reacted at 125° C. analogously to Description 1 above.

The hot viscous polymer solution produced was discharged into a 1 litre jar containing 5 ml methanol to inactivate the catalyst. The toluene autoclave washings were bulked with the polymer solution and thoroughly mixed.

The polymer solution was rotary evaporated to remove toluene, and dried in a vacuum ($5 \times 10^{-2}$ mbar at 80° for 6 hr to give 47.5 g (70% conversion) of terpolymer (D2) as product.

Molecular Wt of the product was measured by gel permeation chromatography using lithium bromide in dimethylformamide as solvent.

MW=390,000

100 MHz NMR was used to measure the relative amounts of the three monomers incorporated in the final terpolymer which were:

83.2 mole % EO
14.9 mole % MDGE
2.0 mole % AGE i) Incorporation of Salt in Matrices/Matrix Precursors (Uncrosslinked Polymers); Measurement of Conductivity of Uncrosslinked Films 1 g of terpolymer (D1) was dissolved in 25 ml dry acetonitrile with stirring under a nitrogen atmosphere, lithium triflate ($CF_3SO_3Li$) was added to the solution, the solution was cast into a film (E9), and the film's conductivity over a range of temperatures was measured by standard AC impedance techniques, all as in Description 1 i).

Conductivity 20° C. = $1.9 \times 10^{-5}$ mho·cm$^{-1}$
The product film (E9) is used in Example 2.

ii) Incorporation of Salt and Liquid in Matrices/Matrix Precursors (Uncrosslinked Polymers); Measurement of Conductivity of Uncrosslinked Films 1 g of terpolymer (D1) was dissolved in 25 ml dry acetonitrile with stirring under a nitrogen atmosphere, lithium triflate ($CF_3SO_3Li$) (0.22 g) and propylene carbonate (0.5 g) were added to the solution, the solution was cast into a film (E10), and the film's conductivity over a range of temperatures was measured by standard AC impedance techniques, all as in Description 1 i).

iii) Incorporation of Salt in Matrix Precursors (Uncrosslinked Polymers/Polymer Solutions); Forming the Matrix by Cross-linking the Precursor 1 g of terpolymer (D2) was dissolved in 25 ml acetonitrile with stirring, and lithium triflate (0.22 g) and dry benzoyl peroxide (0.22 g) were added to the solution which was cast as above into a film (E11) under a stream of nitrogen.

The film was cross-linked by heating in a vacuum oven at 110° C. for 30 minutes.

Conductivity 20° C. determined as in Description 7.=$3.0 \times 10^{-6}$ mho·cm$^1$ iv) Incorporation of Salt and Liquid in Matrix Precursors (Uncrosslinked Polymers/Polymer Solutions); Forming the Matrix by Cross-linking the Precursor 1 g of terpolymer (D1) was dissolved in 25 ml acetonitrile with stirring, and lithium triflate (0.22 g) and dry benzoyl peroxide (0.22 g) Were added to the solution which was cast as above into a film (E12) under a stream of nitrogen.

The film was cross-linked by heating in a vacuum oven at 110° C. for 30 minutes.

DESCRIPTION 4

Preparation of an Ethylene Oxide (EO)/Allyl Glycidyl Ether (AGE) Matrix Precursor (Uncrosslinked Copolymer) (D3)

The following materials were charged to a stirred nitrogen purged 2 1 stainless steel autoclave; AGE (10 ml), and toluene (500 ml), catalyst as in Description 1 above (38 ml) and ethylene oxide (32 ml, as a liquid), and reacted at 125° C. as in Description 1.

The hot viscous polymer solution produced was discharged into a 1 liter jar containing 5 ml methanol to inactivate the catalyst.

The toluene autoclave washings were bulked with the polymer solution and thoroughly mixed.

The polymer solution was rotary evaporated to remove toluene, and dried in a vacuum ($5 \times 10^{-2}$ mbar at 80° for 6 hr to give 27.5 g (74% conversion) of copolymer (D3) as product.

Molecular wt of the product was measured by gel permeation chromatography using lithium bromide in dimethylformamide as solvent.

MW=350,000

100 MHz NMR was used to measure the relative amounts of the three monomers incorporated in the final copolymer which were:

88.2 mole % EO
11.8 mole % AGE i) Incorporation of Salt in Matrices/Matrix Precursors (Uncrosslinked Polymers); Measurement of Conductivity of Uncrosslinked Films 1 g of copolymer (D3) was dissolved in 25 ml dry acetonitrile with stirring under a nitrogen atmosphere, lithium triflate ($CF_3SO_3Li$) Was added to the solution, the solution was cast into a film (E13), and the film's conductivity over a range of temperatures was measured by standard AC impedance techniques, all as in Description 1 i).

Conductivity 20° C. = $2.2 \times 10^{-5}$ mho·cm$^{-1}$
The product film (E13) is used in Example 2.

ii) Incorporation of Salt and Liquid in Matrices/Matrix Precursors (Uncrosslinked Polymers); Measurement of Conductivity of Uncrosslinked Films 1 g of copolymer (D3) was dissolved in 25 ml dry acetonitrile with stirring under a nitrogen atmosphere, thium triflate ($CF_3SO_3Li$) (0.22 g) and propylene carbonate (0.5 g) were added to the solution, the solution was cast into a film (E14), and the film's conductivity over a range of temperatures was measured by standard AC impedance techniques, all as in Description 1 i).

Conductivity 20° C. = $8.4 \times 10^{-4}$ mho·cm$^{-1}$ iii) Incorporation of Salt in Matrix Precursors (Uncrosslinked Polymers/Polymer Solutions); Forming the Matrix by Cross-linking the Precursor 1 g of copolymer (D3) was dissolved in 25 ml acetonitrile with stirring, and lithium triflate (0.22 g) and dry benzoyl peroxide (0.22 g) were added to the solution which was cast as above into a film (E15) under a stream of nitrogen.

The film was cross-linked by heating in a vacuum oven at 110° C. for 30 minutes.

Conductivity 20° C. determined as in Description 7. = $2.8 \times 10^{-6}$ mho·cm$^{-1}$ iv) Incorporation of Salt and Liquid in Matrix Precursors (Uncrosslinked Polymers/Polymer Solutions); Forming the Matrix by Cross-linking the Precursor 1 g of copolymer (D3) Was dissolved in 25 ml acetonitrile with stirring, and lithium triflate (0.22 g) and dry benzoyl peroxide (0.22 g) were added to the solution which was cast as above into a film (E16).

The film was cross-linked by heating in a vacuum oven at 110° C. for 30 minutes

DESCRIPTION 5

Preparation of a Methoxy Ethylene Oxide (EO)/Propylene Oxide Acrylate Random Oligomer (D4)

i) Preparation of a Methoxy Ethylene Oxide (EO)/Propylene Oxide Random Oligomer (D5)

Sodium (0.5 g) in small pieces was added to methanol (32 g) under nitrogen, and the resultant solution was transferred by syringe to a stirred, nitrogen purged, stainless steel alkoxylation reactor. The reactor was sealed and heated to and maintained at 110° C. for a period of 12 hours, and a mixture of ethylene oxide (220 g) and propylene oxide (85 g) was added to it over 3 hours of that period. The reactor was cooled to room temperature.

Yield of the product oligomer (D5); 306 g.

ii) Conversion of (D5) to (D4)

Acryloyl chloride (100 g) was added in portions to a stirred solution of dry triethylamine (121 g) and (D8) (306 g) in methylene chloride (400 ml).

This was effected under nitrogen with occasional cooling. The resultant slurry was stirred for 8 hours.

Water was added slowly to dissolve all the precipitated triethylamine hydrochloride, and the resultant solution was saturated with sodium chloride.

The organic layer was separated off, dried over magnesium sulphate and filtered. Irganox 1010 antioxidant (0.5 g) was added, and the solution was concentrated by rotary evaporation, and then purged with dry air to remove most of the solvent.

Finally the crude (D4) was distilled on a short path still under vacuum ($5 \times 10^{-3}$ mbar) at 200° C. to yield pure (D4) (305 g).

DESCRIPTION 6

Preparation of Urethane-Linked Poly(ethylene glycol) Matrix Precursor.

50 g of dry poly(ethylene-glycol) (MW = 1000; Aldrich) and 1.34 g of dry 2-ethyl-2-(hydroxymethyl)-1,3-propane diol (Aldrich) and 11 g of dry lithium triflate (Aldrich; dried at 100° C. under vacuum for 18 hours) were dissolved in 6 mls of anhydrous propylene carbonate (Aldrich; stored over 4A molecular sieve) with stirring, in a 250ml reaction vessel 10.2 ml of 1,6-diisocyanatohexane (Aldrich) followed by 0.1 ml of dibutylin dilaurate (Aldrich) catalyst were syringed under a blanket of nitrogen into the stirred reaction mixture.

The vessel was immediately immersed into an ice bath and stirred slowly for five minutes, before application in device fabrication as in Example 13.

DESCRIPTION 7

Measurement of Conductivity of the Solid Electrolyte

The ionic conductivity of the foregoing Solid techniques using a Solartron 1250 frequency response analyser.

DESCRIPTION 8

Preparation of Electrochromically Active Substrates by Reactive Magnetron Sputtering One edge of the a sheet of conductive glass glass coated with indium tin oxide (ITO glass, sheet resistance 20 ohm.square$^{-1}$) was masked over an area of ITO of about $10 \times 50$ mm. A thin film of tungsten oxide (generally 0.1 to 0.5 micron thick) was sputtered onto the glass to give an electrochromically active area of about 2500 mm$^2$, and leaving an area of ITO under the masking with which electrical contact could be made.

Transition metal oxides of the types described hereinbefore as suitable as sources/sinks for lithium ions were similarly deposited as films (generally 0.1 to 0.5 micron thick) onto ITO glass. Such materials included vanadium pentoxide.

The above process was also applied to a sheet of conductive polyethylene terephthalate (Melinex, ICI, 100 micron thick) coated with indium tin oxide (sheet resistance 30 ohm.square$^{-1}$), similarly masked to leave an area of ITO under the masking with which electrical contact could be made.

Transition metal oxides of the types described hereinbefore as suitable as electrochromic materials or sources/sinks for lithium ions were similarly deposited as films (generally to the same thicknesses).

DESCRIPTION 9

Preparation of Source/Sink Substrates; Doping the Material with Lithium by Electrochemical Insertion Adhesive copper tape (Chromerics) was applied to the ITO area of vanadium pentoxide coated glass prepared described in Description 8

The sheet of glass was made the cathode (opposite a platinum anode) in an an electrolyte solution of lithium triflate (0.1 M) in propylene carbonate.

Electrolysis under galvanostatic conditions of 10 mA for 25 sec, changed the yellow-green vanadium pentoxide layer to a more transparent pale pink lithium vanadium bronze ($Li_xV_2O_5$, x calculated to be approximately 0.3).

EXAMPLE 1

General Lamination Process for the Preparation of Electrochromic Devices a) The first lamination procedure employed was essentially the known process for the lamination of polyvinylbutyral (PVB) in the manufacture of automotive safety glass (R. M. Sowers, Ford Motor Company in Kirk-Othmer "Enclycopaedia of Chemical Technology", third edition (1978), 13, 978; U.S. Pat. No. 2,994,629 and U.S. Pat. No. 2,374,040).

In the general procedure an assembly comprising two glass sheets of Descriptions 8 and 9 separated by a single layer or two contiguous layers of Solid Electrolyte was set up in the general configuration shown generally the Figure hereinafter and described in the first part of Example 13.

The assembly was placed in a heat-sealable plastics bag, the open end of which was laid in the jaws of a bag sealer inside a vacuum chamber.

The entire system was evacuated to 1 mbar and left to purge off gas for 1 hr, after which the plastics bag was sealed under the vacuum. The chamber was brought back to atmospheric pressure and the bag Was removed.

The assembly within the bag was subjected to 5 to 15 mbar pressure on its extended plane faces and a temperature of 25 to 100° C. between the flat steel pressure blocks of a mechanical press ('block press') in order to laminate it.

The device was removed from the bag, the edges of the laminated device were sealed with a fast-cure epoxy resin, two pieces of adhesive copper tape were applied to the two exposed ITO areas, and the electrochromic properties of the device were tested.

A number of variants of this basic process are described in the following Examples 2 to 10.

b) In variant Example 11 hereinafter, the assembly is not subjected to reduced pressure, and a roller press with heated rollers and a roller speed of 0.2 m/min was used.

In addition to the devices specifically exemplified in the following Examples, other devices are produced by the same procedures using those precursors or Solid Electrolytes cross-referenced to the relevant Examples in the Descriptions.

EXAMPLE 2

Lamination Process using Discrete Film of Uncrosslinked Solid Electrolyte

In a first variant of the general process of Example 1, the Solid Electrolyte layer was a discrete sheet which was trimmed to lie in register with the glass sheets.

The following devices were made up in accordance with Example 1 via this variant, using the discrete Solid Electrolyte sheet prepared in Description 2.

| Device | Electro-chromic material | Source/sink material | Electrolyte, mm thick | Press bar, °C., min. |
| --- | --- | --- | --- | --- |
| (ED1) | $WO_3$ | $Li_{0.3}V_2O_5$ | (E4) 0.1 | 10, 40, 30 |
| (ED2) | $WO_3$ | $Li_{0.3}V_2O_5$ | (E5) 0.05 | 8, 40, 45 |

EXAMPLE 3

Lamination Process using Film of Uncrosslinked Solid Electrolyte Cast in Situ on One Glass Sheet In a second variant of Example 1, the Solid Electrolyte was cast in situ onto one of the glass sheets.

In this variant, a Solid Electrolyte solution was poured onto the electrochromic material layer of the relevant glass sheet prepared as in Description 8, and a doctor blade drawn across the surface at 500 micron above it.

The solvent was allowed to evaporate to form a film in situ.

The following device was made up in accordance with Example 1 via this variant:

| Device | Electro-chromic material | Source/sink material | Electrolyte, mm thick | Press bar, °C., min. |
| --- | --- | --- | --- | --- |
| (ED3) | $WO_3$ | $Li_{0.3}V_2O_5$ | (E6) 0.05 | 10, 50, 45 |

EXAMPLE 4

Lamination Process using Films of Uncrosslinked Solid Electrolyte Cast in Situ on Both Glass Sheets In a third variant of Example 1, the Solid Electrolyte was produced as two layers, each cast in situ onto one of the glass sheets, as in Example 3. In this variant, a Solid Electrolyte solution was poured onto
  i) the electrochromic material layer, and
  ii) the source/sink material of the respective glass sheets prepared as in Descriptions 8 and 9.

The following device was made up in accordance with Example 1 via this variant.

| Device | Electro-chromic material | Source/sink material | Electrolyte, mm thick | Press bar, °C., min. |
| --- | --- | --- | --- | --- |
| (ED4) | $WO_3$ | $Li_{0.3}V_2O_5$ | (E6) 0.06 | 10, 50, 45 |

EXAMPLE 5

Lamination Process using Film of Uncrosslinked Solid Electrolyte Cast and Cross-linked in Situ on One Glass Sheets In a fourth variant of Example 1, the Solid Electrolyte (containing a cross-linking initiator) was cast in situ onto the electrochromic material on one of the glass sheets, as in Example 3, and then a) the assembly was laminated as in Example 1, and cross-link the Solid Electrolyte in situ.

The following device was made up in accordance with Example 1 via this variant:

| Device | Electro-chromic material | Source/sink material | Electro-lyte, mm thick | Press bar, °C., min. |
|---|---|---|---|---|
| (ED5) | $WO_3$ | $Li_{0.3}V_2O_5$ | (E7) 0.05 | a) 7, 40, 30 b) 7, 100, 30 |

EXAMPLE 6

Lamination Process using Film of Uncrosslinked Solid Electrolyte Cast and Cross-linked in Situ on Both Glass Sheets In a fifth variant of Example 1, the Solid Electrolyte (containing a cross-linking initiator) was two layers, each cast in situ onto one of the glass sheets as in Example 4, and cross-linked in situ as in Example 5.

The following device was made up in accordance with Example 1 via this variant:

| Device | Electro-chromic material | Source/sink material | Electro-lyte, mm thick | Press bar, °C., min. |
|---|---|---|---|---|
| (ED6) | $WO_3$ | $Li_{0.3}V_2O_5$ | (E7) 0.06 | 10, 50, 45 |

EXAMPLE 7

Electrolyte Cast and Partially Cross-linked in Situ before Lamination on One Glass Sheet In a sixth variant of Example 1, the Solid Electrolyte (containing a cross-linking initiator) was cast in situ onto the electrochromic material on one of the glass sheets as in Example 4, and partially cross-linked in situ by heating under nitrogen in an oven at 85° C. for 10 min, before lamination as in Example 6.

The following device was made up in accordance with Example 1 via this variant:

| Device | Electro-chromic material | Source/sink material | Electro-lyte, mm thick | Press bar, °C., min. |
|---|---|---|---|---|
| (ED7) | $WO_3$ | $Li_{0.3}V_2O_5$ | (E8) 0.05 | 10, 50, 45 |

EXAMPLE 8

Lamination Process using Film of Uncrosslinked Solid Electrolyte Cast and Cross-linked in Situ on One Glass Sheet before Lamination with Oxygen Inhibition of Cross-Linking at the Surface In a seventh variant of Example 1, the Solid Electrolyte (containing a cross-linking initiator) was cast in situ onto the source/sink material on one of the glass sheets as in Example 3, and cross-linked in situ by heating under a stream of nitrogen with 2% v/v oxygen in an oven at 85° C. for 45 min, before lamination as in Example 3.

The following device was made up in accordance With Example 1 via this variant.

| Device | Electro-chromic material | Source/sink material | Electro-lyte, mm thick | Press bar, °C., min. |
|---|---|---|---|---|
| (ED8) | $WO_3$ | $Li_{0.3}V_2O_5$ | (E8) 0.05 | a) 8, 45, 30 followed by b) 12, 100, 60 |

EXAMPLE 9

Lamination Process using Film of Uncrosslinked Solid Electrolyte Cast and Cross-linked in Situ on One Glass Sheet before Lamination with Melt Processable Plasticiser at the Surface In an eighth variant of Example 1, the Solid Electrolyte (containing a cross-linking initiator) was cast in situ onto the electrochromic material on one of the glass sheets as in Example 3, and cross-linked in situ as in Example 8.

Some of a solution of polyethylene glycol (MWt 1000, 1 g) and lithium triflate (0.22 g) in dry acetonitrile was spread With a spatula onto the other glass sheet, coated with lithium-doped vanadium pentoxide, in a dry inert atmosphere, and the solvent evaporated to give a film c. 10 micron thick.

The two glass sheets were laminated as in Example 3.

The following device was made up in accordance with Example 1 via this variant.

| Device | Electro-chromic material | Source/sink material | Electro-lyte, mm thick | Press bar, °C., min. |
|---|---|---|---|---|
| (ED9) | $WO_3$ | $Li_{0.3}V_2O_5$ | (E9) 0.05 | 10, 40, 45 |

EXAMPLE 10

Lamination Process using Film of Uncrosslinked Solid Electrolyte Cast and Cross-linked in Situ on One Glass Sheet before Lamination with Uncrosslinked Polymer with Plasticiser at the Surface In a tenth variant of Example 1, the Solid Electrolyte (containing a cross-linking initiator) was cast in situ onto the electrochromic material on one of the glass sheets as in Example 4, and cross-linked in situ as in Example 9.

A solution of copolymer (D1) (1 g) and propylene carbonate (1 g) in dry methyl formate was cast onto a glass sheet coated with lithium-doped vanadium pentoxide in a dry inert atmosphere as in Example 3, to give a plasticised polymer film.

The two glass sheets were laminated as in Example 3.

The following device was made up in accordance With Example 1 via this variant:

| Device | Electro-chromic material | Source/sink material | Electrolyte, mm thick | Press bar, °C., min. |
|---|---|---|---|---|
| (ED10) | WO$_3$ | Li$_{0.3}$V$_2$O$_5$ | (E7) 0.05 | 10, 40, 45 |

EXAMPLE 11

Lamination Process using Film of Uncrosslinked Solid Electrolyte Cast and Cross-linked in Situ on a Glass Sheet before Lamination with a Plastics Sheet In a variant of Example 1 b), the Solid Electrolyte (containing a cross-linking initiator) was cast in situ onto a glass sheets coated with lithium-doped vanadium pentoxide as in Example 4.

It was cross-linked in situ as in Example 10.

This sheet was laminated with a sheet of polyethylene terephthalate (Melinex, ICI, 100 micron thick) coated with indium tin oxide and and with tungsten oxide electrochromic material as described in Description 8, using a roller press, as described in Example 1 b).

The following device was made up in accordance with Example 1 b) via this variant:

| Device | Electro-chromic material | Source/sink material | Electrolyte, mm thick | Press bar, °C., min. |
|---|---|---|---|---|
| (ED11) | WO$_3$ | Li$_{0.3}$V$_2$O$_5$ | (E7) 0.05 | 2-3, 90, 45 |

EXAMPLE 12

Testing of Devices

A d.c. potential of 1 to 3 V was applied between the electrochromically coated ITO electrode and the source/sink coated ITO electrode of the devices of Examples 2 to 15, by means enabling its polarity to be automatically reversed at a plurality of set intervals over long periods.

Where the former electrode was at a negative potential with respect to the latter, rapid diffusion of lithium ions from the Solid Electrolyte into the tungsten oxide matrix resulted in a deep blue coloration Reversal of the polarity resulted in bleaching.

All the devices produced as described in Examples 2 to 15 were defect-free and had a good electrochromic performance with no visible deterioration after continuous cycling over periods of up to several days.

EXAMPLE 13

Device Fabrication by Injection of Methoxy Ethylene Oxide/Propvlene Oxide Acrylate Random Oligomer Into An Electrochromic "Mould" and Crosslinking in Situ An alternative assembly of electrochromic thin-layer devices in accordance with the present invention is described below with reference to the accompanying (not to scale) Figure which is a side elevation of a thin-layer device assembly of the present invention in the form of a variable transmission window which is e.g. suitable for vehicles.

The extended planar thin-layer device (DA2) depicted in the Figure consists of a) a sheet of glass 5 bearing an ITO electrode layer 4A and a layer 2 of electrochromic material WO$_3$ and b) a second sheet of glass 5B bearing and ITO electrode layer 4B and a a source/sink layer of lithium doped V$_2$O$_5$ (both prepared as in Descriptions 8 and 9) opposite each other, and separated by c) a 500μm thick synthetic rubber gasket 7 and a layer of Solid Electrolyte 1 of a similar thickness.

Each of the sheets 5 and 6 is provided with a strip of copper tape in contact with, and acting as a current collector from, the respective electrode. The device is contained by a peripheral epoxide sealant 8 around the two sheets 5 and 6.

The device is conveniently produced by a method comprising the in situ polymerisation of the Solid Electrolyte as described generally hereinbefore.

In such production, the device was made up Without the layer 1 of Solid Electrolyte, and with the sheets 5 and 6 spaced apart by the peripheral synthetic rubber gasket seal 7 and held together with a number of peripheral spring clips 11.

The interior of the device was purged with nitrogen fed through one of two needles inserted through opposite portions of the gasket.

Methoxy ethylene oxide/propylene oxide acrylate co-oligomer (D4;10 g), lithium triflate (2.5 g), propylene carbonate (6 g), tetramethylene glycol diacrylate (Polyscience; 0.25 g) and dry benzoyl peroxide (0.05 g) were purged with nitrogen and stirred under nitrogen in a flask until solution occurred.

The device was held upright and the mixture transferred to the "mould" by syringe through the gasket 7 from the bottom.

The needles were withdrawn, the device placed in a nitrogen-flushed oven at room temperature and the temperature raised to 80° C. over 1 hour and held at that temperature for 24 hours to cure the Solid Electrolyte precursor.

The device was removed from the oven, and edge sealed with the fast cure epoxy resin sealant 8, giving a satisfactory working electrochromic window (ED12).

This was tested as described in Example 12.

EXAMPLE 14

Device Fabrication Incorporating Injection of Urethane-Linked Poly(ethylene glycol) Matrix Precursor into an Electrochromic "Mould" and Crosslinking in Situ.

A device (ED13) was fabricated employing the fabrication technique described in Example 13 using the urethane-linked polyethylene glycol/matrix precursor from Description 6 and crosslinking in nitrogen purged oven at 70° C. for 1 hour.

A small portion of the above crosslinked film was made between two sheets of ordinary soda glass under the same reaction conditions, the glass removed from the film and its conductivity measured via standard AC impedance techniques as in Description 7.

Conductivity 20° C. = $6.3 \times 10^{-4}$ mho cm$^{-1}$

Analogues and derivatives of any of the foregoing devices may be produced varying the component materials of the device e.g. using any other suitably conductive materials within the scope of the present invention which are inert in any undesirable side reactions.

I claim:

1. In an electrochromic device which comprises a conductive second electrode and first electrode separated by a solid electrolyte and an electrochromic material capable of reversible electrochromic interaction with activating electrons or ions under the influence of an electrical potential applied across the electrodes, the improvement wherein the solid electrolyte in the device comprises:
   a) a matrix of cross-linked main polymer chains, having side-chains linked to the main polymer chains, which side chains comprise polar groups,
   b) a polar aprotic liquid dispersed in the matrix, and
   c) an ionised ammonium or alkali metal salt dissolved in the matrix or liquid.

2. A device according to claim 1 wherein the solid electrolyte comprises the polar aprotic liquid 6.

3. A device according to claim 1 wherein the activating ions are those of lithium and the polar groups in the side chains in the matrix a) are free from active hydrogen ions.

4. A device according to claim 3, wherein the main chains are hydrocarbons or polyether cross-linked by C—C bonds or urethane functions between the main or side chains.

5. A device according to claim 1 wherein the main polymer chains in the matrix are essentially organic polymer chains, comprising sulphur, nitrogen, phosphorus or oxygen atoms; or ones comprising silicon and oxygen atoms.

6. A device according to claim 1 which comprises an electrode capable of supplying or receiving atoms for electrochromic interaction with the electrochromic material.

7. A device according to claim 1 in the form of a number of laminated multiple thin layer components.

8. A device according to claim 1, wherein the matrix polymer main chains are cross-linked and essentially organic, and the sidechains comprise ester or ether linkages.

9. A process for preparing a device which comprises a conductive second electrode and first electrode separated by a solid electroyte and an electrochromic material capable of reversible electrochromic interaction with activating electrons or ions under the influence of an electrical potential applied across the electrodes, the solid electrolyte in the device comprising
   a) a matrix of cross-linked main polymer chains, having side-chains linked to the main polymer chains, which side chains comprise polar groups,
   b) a polar aprotic liquid dispersed in the matrix, and
   c) an ionised ammonium or alkali metal salt dissolved in the matrix of liquid
said process comprising the steps of:
   a) coating a electrochromic material which is capable of being activated by ions onto a first electrode as a thin film on a first support with the solid electrolyte,
   b) coating a material which is a source of the activating ions onto a second electrode as a thin film on a second support,
   c) contacting the solid electrolyte with the source material,
   d) hot-press vacuum laminating all the foregoing integers together, and
   e) converting any precursor to the solid electrolyte.

* * * * *